US012761771B2

(12) United States Patent
Jiang et al.

(10) Patent No.: US 12,761,771 B2
(45) Date of Patent: Oct. 13, 2026

(54) DATA DISPLAY METHOD, MOBILE TERMINAL, AND STORAGE MEDIUM

(71) Applicant: Beijing Zitiao Network Technology Co., Ltd., Beijing (CN)

(72) Inventors: Haiqiang Jiang, Beijing (CN); Haiyang Guo, Beijing (CN); Chen Zhao, Beijing (CN); Dongdong Zuo, Beijing (CN); Shuji Lin, Beijing (CN); Mengyuan Han, Beijing (CN); Yanting Hua, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/771,907

(22) Filed: Jul. 12, 2024

(65) Prior Publication Data

US 2024/0370131 A1 Nov. 7, 2024

Related U.S. Application Data

(63) Continuation of application No. PCT/CN2023/070040, filed on Jan. 3, 2023.

(30) Foreign Application Priority Data

Jan. 12, 2022 (CN) ......................... 202210033314.6

(51) Int. Cl.
*G06F 3/04815* (2022.01)
*G06F 3/04847* (2022.01)
(Continued)

(52) U.S. Cl.
CPC ...... *G06F 3/04815* (2013.01); *G06F 3/04847* (2013.01); *G06F 3/04886* (2013.01); *G06F 21/36* (2013.01); *G06F 2203/04801* (2013.01)

(58) Field of Classification Search
CPC ............... H10K 59/353; H10K 59/131; H10K 59/18; H10K 59/60; H10K 59/65; H10K 59/128; H10K 59/40; H01L 27/156
See application file for complete search history.

(56) References Cited

U.S. PATENT DOCUMENTS

2012/0183172 A1* 7/2012 Stroila ................ G06V 30/142 382/100
2013/0215109 A1* 8/2013 Miesnieks ............... G06T 13/20 345/419
(Continued)

FOREIGN PATENT DOCUMENTS

CN 111240476 A 6/2020
CN 111862341 A 10/2020
(Continued)

OTHER PUBLICATIONS

International Search Report and Written Opinion for PCT/CN2023/070040, mailed May 26, 2023, 13 pages.
(Continued)

*Primary Examiner* — Jonathan A Boyd
(74) *Attorney, Agent, or Firm* — Astute IP Law Group

(57) ABSTRACT

A data display method, a data display apparatus, a mobile terminal, and a computer-readable storage medium are provided. The method includes displaying a real-time image acquired by a mobile terminal, a preset positioning mark, and a preset virtual object in a target page of the mobile terminal, a first display region corresponding to the preset positioning mark being fixed in the target page; adjusting a second display region corresponding to the preset virtual object in the target page in response to movement of the mobile terminal; and in response to a relationship between the second display region and the first display region being determined as meeting a preset condition, displaying inter-
(Continued)

action information related to a target user logging in the target page.

19 Claims, 4 Drawing Sheets

(51) Int. Cl.

| | |
|---|---|
| ***G06F 3/04886*** | (2022.01) |
| ***G06F 21/36*** | (2013.01) |

(56) References Cited

U.S. PATENT DOCUMENTS

| | | | | |
|---|---|---|---|---|
| 2017/0359560 | A1* | 12/2017 | Winn | H04N 23/64 |
| 2018/0043263 | A1* | 2/2018 | Cao | A63F 13/65 |
| 2020/0117336 | A1 | 4/2020 | Mani et al. | |

FOREIGN PATENT DOCUMENTS

| | | | |
|---|---|---|---|
| CN | 112148188 | A | 12/2020 |
| CN | 112148189 | A | 12/2020 |
| CN | 112884908 | A | 6/2021 |
| CN | 113117332 | A | 7/2021 |
| CN | 113721804 | A | 11/2021 |
| CN | 114371904 | A | 4/2022 |
| CN | 114371904 | B | 9/2023 |

OTHER PUBLICATIONS

Notice to Grant for Chinese Patent Application No. 202210033314.6, mailed Aug. 21, 2023, 6 pages.

Office Action for Chinese Patent Application No. 202210033314.6, mailed Apr. 8, 2023, 18 pages.

* cited by examiner

DATA DISPLAY METHOD, MOBILE TERMINAL, AND STORAGE MEDIUM

CROSS-REFERENCE TO RELATED APPLICATIONS

This application is a continuation of International Patent Application No. PCT/CN2023/070040, filed on Jan. 3, 2023, which claims the priority to and benefits of the Chinese Patent Application No. 202210033314.6, which was filed on Jan. 12, 2022. All the aforementioned patent applications are hereby incorporated by reference in their entireties.

TECHNICAL FIELD

Embodiments of the present disclosure relates to a data display method, a mobile terminal, and a storage medium.

BACKGROUND

With the popularity of mobile terminals, mobile terminal devices such as mobile phones have become necessary tools for people's work and life.

At present, functions that can be realized in the mobile terminals are more and more abundant, and users may interact with the mobile terminals. For example, the users may interact with the mobile terminals by actions such as tapping or sliding on screens of the mobile terminals, so as to realize the corresponding functions. However, the above interaction manners are monotonous and need to be improved.

SUMMARY

Embodiments of the present disclosure provide a data display method and apparatus, a storage medium, and a mobile terminal, which may optimize the information interaction solution in prior art.

In a first aspect, embodiments of the present disclosure provide a data display method and the method includes:

- displaying a real-time image acquired by a mobile terminal, a preset positioning mark, and a preset virtual object in a target page of the mobile terminal, wherein a first display region corresponding to the preset positioning mark is fixed in the target page;
- adjusting a second display region corresponding to the preset virtual object in the target page in response to movement of the mobile terminal; and
- in response to a relationship between the second display region and the first display region being determined as meeting a preset condition, displaying interaction information related to a target user logging in the target page.

In a second aspect, embodiments of the present disclosure provide a data display apparatus, including:

- a display module, configured to display a real-time image acquired by a mobile terminal, a preset positioning mark, and a preset virtual object in a target page of the mobile terminal, wherein a first display region corresponding to the preset positioning mark is fixed in the target page;
- a display region adjustment module, configured to adjust a second display region corresponding to the preset virtual object in the target page in response to movement of the mobile terminal; and
- an interaction information display module, configured to: in a case where a relationship between the second display region and the first display region is determined as meeting a preset condition, display interaction information related to a target user logging in the target page.

In a third aspect, embodiments of the disclosure provide a mobile terminal including a memory, a processor, and a computer program stored in the memory and executable on the processor. The processor implements the methods provided by embodiments of the present disclosure when executing the computer program.

In a fourth aspect, embodiments of the present disclosure provide a computer-readable storage medium storing a computer program thereon. The methods provided by embodiments of the present disclosure is implemented when the computer program is executed by a processor.

DETAILED DESCRIPTION

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

Modifications of "one" and "more" mentioned in the present disclosure are schematic rather than restrictive, and those skilled in the art should understand that unless otherwise explicitly stated in the context, it should be understood as "one or more".

The names of messages or information exchanged between multiple apparatuses in this embodiment are used for illustrative purposes only and are not used to limit the scope of such messages or information.

In the following embodiments, both optional features and examples are provided in each of embodiments, and the various features recorded in the embodiment can be combined to form multiple optional solutions. Each numbered embodiment should not be regarded as only one technical solution.

Figure 1:
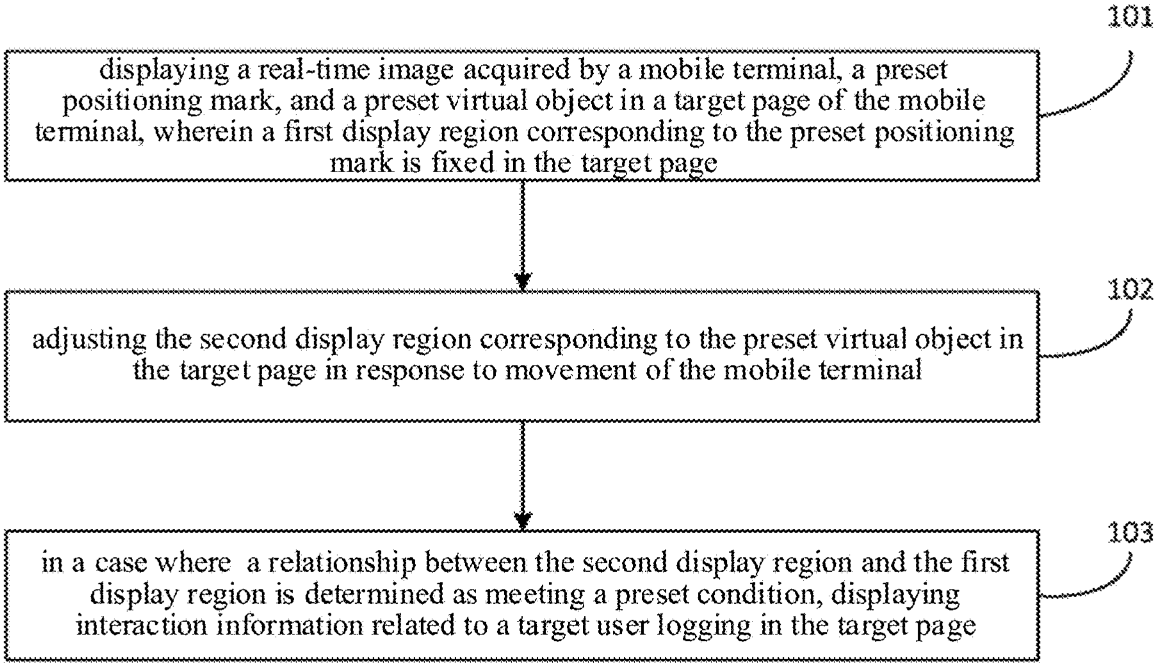
FIG. 1 is a schematic flowchart of a data display method provided by an embodiment of the present disclosure.

FIG. 1 is a schematic flowchart of a data display method according to an embodiment of the present disclosure. The method may be performed by a data display apparatus, where the apparatus may be implemented by software and/or hardware, and generally may be integrated in a mobile terminal. The mobile terminal may be a mobile device such as a mobile phone, a smart watch, smart glasses, a tablet computer, and a personal digital assistant, which is not limited. As illustrated in FIG. 1, the method may include the following steps.

Step 101: displaying a real-time image acquired by a mobile terminal, a preset positioning mark, and a preset virtual object in a target page of the mobile terminal, wherein a first display region corresponding to the preset positioning mark is fixed in the target page.

In embodiments of the present disclosure, the mobile terminal may be internally or externally connected with an image acquisition apparatus such as a camera, so that the mobile terminal may have a capability of acquiring a real-time image. The target page may be a page in a preset application program. The preset application program is loaded in the mobile terminal, and a specific type of the preset application program is not limited, for example, a social type application program, a live broadcast type application program, a video type application program, or an information type application program. For example, the preset application program may call an image acquisition function (for example, a camera function) of the mobile terminal to obtain a real-time image acquired by the mobile terminal and display the real-time image in the target page, so as to realize a preview effect of the real-time image in the target page. Optionally, a preset portal corresponding to the target page is set in the preset application program, and the user may enter the target page by triggering the preset portal, that is, this step is executed after it is detected that the preset portal is triggered.

For example, the preset positioning mark is displayed in the first display region in the target page, and a boundary of the first display region may match an outline of the preset positioning mark. The first display region may be a preset fixed region, which position is not limited, for example, it may be a center position, a lower-middle position, or a lower-right corner position of the target page. An expression form of the preset positioning mark is not limited, for example, it may be a rectangular frame, a circle, or the like.

In embodiments of the present disclosure, a type of the preset virtual object is not limited, for example, it may be a virtual figure (for example, a cartoon character, a virtual doll, or an animal figure), a virtual object (for example, a virtual bouquet or a virtual food), a virtual mark (for example, a virtual arrow), or the like. The preset virtual object is displayed in the second display region in the target page. A boundary of the second display region may match an outline of the preset virtual object, and the second display region is generally different from the first display region. When the target page is entered, the second display region (which may be considered as an initial second display region) may be a region set in advance which position is not limited, for example, it may be an upper-right corner position or an upper-middle position of the target page. The initial second display region may be the same or different each time the target page is entered. Generally, there is no intersection between the initial second display region and the first display region, and the second display region may change in response to display of the target page.

Figure 2:
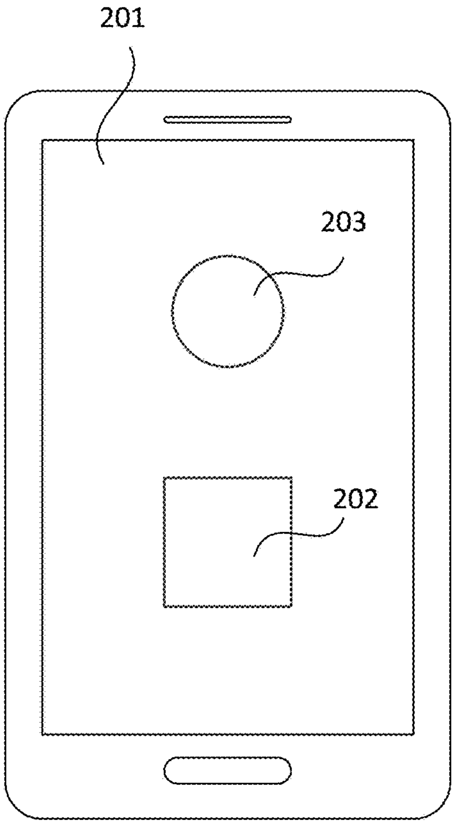
FIG. 2 is a schematic diagram of a page provided by an embodiment of the present disclosure.

FIG. 2 is a schematic diagram of a page provided by an embodiment of the present disclosure, which illustrates the page display content when the target page is entered. As illustrated in FIG. 2, a preset positioning mark 202 and a preset virtual object 203 are displayed in a target page 201. A first display region is located in a lower-middle position of the page and a second display region is located in an upper-middle position of the page.

Step 102: adjusting the second display region corresponding to the preset virtual object in the target page in response to movement of the mobile terminal.

For example, when using the mobile terminal, a user generally needs to contact with the mobile terminal through a body part, so as to have a function of fixing the mobile terminal, for example, holding a mobile phone by a hand, wearing a smart watch on a wrist, or wearing smart glasses on the head, the user may control the movement of the mobile terminal through movement of the body part.

For example, in response to the movement of the mobile terminal, the second display region may be adjusted in the target page. An adjustment manner and an adjustment basis are not limited, for example, it may include but are not limited to adjusting a position, a size or a shape of the second display region and so on, one or more of which may be adjusted at the same time. Optionally, a correspondence between different movement processes and adjustment manners may be preset, and the second display region may be adjusted correspondingly according to a current movement process.

For example, with the movement of the mobile terminal, the real-time image also changes. In other words, the display of the preset virtual object is adjusted in response to the change of the real-time image to create a visual effect that the preset virtual object exists in the real world so as to enhance an interaction interest.

Step 103: in a case where a relationship between the second display region and the first display region is determined as meeting a preset condition, displaying interaction information related to a target user logging in the target page.

For example, after adjustment, the relationship between the second display region and the first display region will change, and the relationship herein may include, for example, a relationship based on a position or a relationship based on an overlapping region. The relationship based on the position may include, for example, a distance between a center point of the first display region (that is, the first center) and a center point of the second display region (that is, the second center), whether the first display region and the second display region intersect, etc. The relationship based on the overlapping region may include, for example, a size of an area of an overlapping region between the first display region and the second display region, a shape of the overlapping region, etc.

For example, the preset condition may be set according to an actual requirement, for example, the distance between the center point of the first display region and the center point of the second display region is less than or equal to a preset distance threshold. In a case where it is detected that the preset condition is met, the interaction information related to the target user logging in the target page may be displayed. For example, FIG. 2 is illustrated as an example. The movement of the mobile terminal is controlled, so that the preset virtual object 203 approaches the preset positioning mark 202. In this way, the distance between the center point of the first display region and the center point of the second display region is continuously reduced, and when it is less than or equal to the preset distance threshold, the interaction information of the target user logging in the target page is triggered for display.

For example, the target user may be understood as a user currently logging in the target page, and the interaction information may correspond to a function, an event, an interaction task, or the like in the preset application program, it may be set according to a characteristic of the preset application program and an actual business requirement, etc. which is not limited. For example, the interaction information may be detailed information of a preset interaction event. For example, the interaction information may be prompt information for completing a preset interaction task.

For example, the count of the interaction information may be multiple, and different interaction information may correspond to different preset conditions, so that the interaction information that may be triggered for display by controlling the movement of the mobile terminal is enriched, which enhances the interest, and increases the functions that may be carried by the target page. For example, the distance between the first center point and the second center point is less than or equal to the preset distance threshold and the first center point is located on the left side of the second center point which triggers first interaction information; the distance between the first center point and the second center point is less than or equal to the preset distance threshold and the first center point is located on the right side of the second center point which triggers second interaction information; and the like.

According to the data display method provided in embodiments of the present disclosure, the real-time image acquired by the mobile terminal, the preset positioning mark, and the preset virtual object are displayed in the target page of the mobile terminal, wherein the first display region corresponding to the preset positioning mark is fixed in the target page; in response to the movement of the mobile terminal, the second display region corresponding to the preset virtual object is adjusted in the target page, and in a case where the relationship between the second display region and the first display region is determined as meeting the preset condition, the interaction information related to the target user logging in the target page is displayed. The technical solutions are adopted, so that the user can change the preset virtual object and the real-time image at the same time by controlling the movement of the mobile terminal, and when the relationship between the display region of the preset positioning mark and the display region of the preset virtual object meets a specified condition, the interaction information of the target user logging in the target page is triggered for display, which increases the interest of interaction between the user and the mobile terminal and enriches interaction forms.

In some embodiments, before the second display region corresponding to the preset virtual object is adjusted in the target page, the method further includes: establishing an association relationship between the second display region corresponding to the preset virtual object and a target real object in the real-time image, wherein the adjusting the second display region corresponding to the preset virtual object in the target page in response to movement of the mobile terminal includes: in response to the movement of the mobile terminal, adjusting a position and/or a size of the second display region corresponding to the preset virtual object in the target page according to an imaging position change and/or an imaging size change of the target real object in the real-time image. An advantage of this setting is that the association relationship between the second display region corresponding to the preset virtual object and the target real object in the real-time image is established, so that the second display region may change synchronously with an imaging change of the target real object, which creates a visual effect that the preset virtual object exists in the real world, so as to enhance the interest.

For example, when the target page is entered, image content included in the second display region may be determined in the current real-time image, and a real object in the determined image content may be identified as the target real object. During the movement of the mobile terminal, the image acquisition apparatus moves with the movement of the mobile terminal, and the real-time image changes, and an imaging position of the target real object in the real-time image also changes. Identification is performed on the target real object in the current real-time image, to determine a current imaging position of the target real object and adjust the position of the second display region corresponding to the preset virtual object to the current imaging position of the target real object in the target page. In addition, if the mobile terminal approaches the target real object, an imaging size also changes. Enlargement or reduction of a size of the second display region may be adjusted synchronously according to enlargement or reduction of the imaging size of the target real object. That is, the imaging size of the target real object becomes larger, and the size of the second display region also becomes larger synchronously, and the imaging size of the target real object becomes smaller, and the size of the second display region also becomes smaller synchronously.

In some embodiments, the adjusting the second display region corresponding to the preset virtual object in the target page in response to movement of the mobile terminal includes: in response to the movement of the mobile terminal, obtaining movement data of the mobile terminal, and adjusting the position and/or the size of the second display region corresponding to the preset virtual object in the target page according to on the movement data. An advantage of this setting is that the second display region may be adjusted more accurately according to the movement data.

In embodiments of the present disclosure, the movement data may include, for example, a speed, an acceleration, an angular velocity and an angular acceleration, and may also include, for example, a movement direction, a movement distance and a rotation angle. After the target page is entered, the movement data of the mobile terminal may be obtained through a movement sensor in the mobile terminal. The movement sensor may include, for example, an acceleration sensor, a gyroscope and an electronic compass. Optionally, a correspondence relationship (which may be recorded as a preset correspondence relationship) between different movement data and adjustment manners may be preset, and each adjustment manner may further include adjustment parameters such as a moving direction and a moving distance of the position, a scaling multiple of the size, and a changing process of the shape. After obtaining the movement data, a corresponding adjustment manner is determined by querying the preset correspondence relationship, and then the second display region is adjusted accordingly.

For example, a preset frequency may be used to obtain the movement data. The preset frequency may be set according to an actual requirement. After movement data is obtained each time, the second display region is adjusted according to the currently obtained movement data. When the preset frequency is high, a visual effect of dynamically adjusting the second display region in real time may be achieved for the user, and feedback efficiency for the movement of the mobile terminal and fluency of page content changes may be improved.

In some embodiments, the relationship between the second display region and the first display region meeting a preset condition includes: the area of the overlapping region between the second display region and the first display region is larger than or equal to a preset area threshold. An advantage of this setting is that the user may observe a trend of a change of the second display region more intuitively, thereby helping control the movement of the mobile terminal more quickly and accurately and improving interaction efficiency.

For example, the preset area threshold may be set according to an actual requirement. For example, the preset area threshold may be an area of the second display region. That is, when the second display region completely enters the first display region, it may be considered that the preset condition is met. For example, the preset area threshold may be an area of the first display region. That is, in a case where the second display region completely includes the first display region, it may be considered that the preset condition is met.

In some embodiments, the movement data includes a movement direction and a movement distance. The adjusting the position of the second display region corresponding to the preset virtual object in the target page according to the movement data includes: determining a first motion vector of the mobile terminal on a plane where the target page is located according to the movement data; determining a second motion vector according to the first motion vector, wherein a direction of the second motion vector is opposite to a direction of the first motion vector, and a length of the second motion vector is positively correlated with a length of the first motion vector; adjusting the position of the second display region corresponding to the preset virtual object in the target page according to the second motion vector. An advantage of this setting is that it is convenient for the user to quickly master a control manner of controlling the movement of the mobile terminal to trigger display of the interaction information, thereby controlling the movement of the mobile terminal more quickly and accurately and improving interaction efficiency.

For example, when the user controls the movement of the mobile terminal, a movement direction may intersect with the plane where the target page is located. In order to facilitate an operation of the user and standardize various movement data, the movement direction and the movement distance may be mapped into the plane where the target page is located to obtain the first motion vector, and how to adjust the position of the second display region may be determined according to the first motion vector. For example, the second motion vector is determined according to the first motion vector, and then the position of the second display region is adjusted according to the second motion vector. The direction of the second motion vector is opposite to the direction of the first motion vector. For example, the direction of the second motion vector is a direction from the first display region to the second display region, and the direction of the second motion vector is a direction from the second display region to the first display region. The length of the second motion vector is positively correlated with the length of the first motion vector. For example, a first scale factor may be set in advance, and the length of the second motion vector is a product of the length of the first motion vector and the first scale factor. Optionally, the adjusting the position of the second display region corresponding to the preset virtual object in the target page according to the second motion vector may be: using a current position of the second display region as a starting point of the second motion vector and adjusting the position of the second display region to an end point of the second motion vector.

In some embodiments, the adjusting the size of the second display region corresponding to the preset virtual object in the target page according to the movement data includes: adjusting the size of the second display region corresponding to the preset virtual object in the target page according to the length of the second motion vector, wherein the size is positively correlated with the length of the second motion vector. An advantage of this setting is that in a case where the length of the second movement vector is larger and larger, a visual effect that the preset virtual object is getting closer and closer to the user may be presented, and in a case where the length of the second movement vector is smaller and smaller, a visual effect that the preset virtual object is getting further and further away from the user may be presented, which enhances the interest. For example, a second scale factor may be set in advance, a size enlargement factor may be determined according to a product of the length of the first motion vector and the second scale factor, and the size of the second display region may be enlarged according to the size enlargement factor.

In some embodiments, the method further includes: displaying a preset control associated with the preset virtual object in the target page; and in response to the preset control being triggered, automatically adjusting the second display region corresponding to the preset virtual object in the target page within a preset duration, so that the relationship between the second display region and the first display region meets the preset condition. An advantage of this setting is that a faster display trigger manner of the interaction information may be provided, which is convenient for the user to choose according to a requirement of the user, enriches trigger manners while ensuring the interest of interaction information display trigger, and r improves display efficiency of the interaction information.

For example, a display position and a display form of the preset control are not limited. For example, it may be displayed in the first display region or below the first display region in the form of a button or may be displayed in the second display region or on the right side of the second display region. The preset duration may be set according to an actual requirement, for example, 1 second.

In some embodiments, a count of the preset virtual objects is at least one. When the count of the preset virtual objects is at least two, a count of pieces of the interaction information is at least two, and interaction information corresponding to different preset virtual objects is different. An advantage of this setting is that different preset virtual objects are used to indicate different interaction information, which enriches interaction information that may be triggered for display by controlling the movement of the mobile terminal and is convenient for the user to quickly distinguish display trigger manners of the different interaction information.

In some embodiments, the method further includes: displaying preset prompt information in the target page, wherein the preset prompt information is used to prompt the user to control the movement of the mobile terminal to trigger display of the interaction information. An advantage of this setting is that it is convenient for the user to quickly know how to control the movement of the mobile terminal to trigger the interaction information according to the preset prompt information, which improves interaction efficiency. Optionally, the preset prompt information may be text prompt information, and may be an operation illustration animation, or the like, and the form of the preset prompt information is not limited.

In some embodiments, the interaction information includes specified interaction information of a preset theme, and the preset virtual object is associated with the preset theme. An advantage of this setting is that the interaction may be performed based on the preset theme, and the interaction information in the preset theme may be triggered for display in a novel interaction form, which enriches the preset application program functions.

For example, various themes may be set in an application program. The themes may involve some elements with high relevance to the themes. For example, related elements of a Spring Festival theme may include Spring Festival couplets, firecrackers, zodiac signs, and the like, and related elements of a Valentine's Day theme may include chocolates, roses, and the like. In embodiments of the present disclosure, the preset theme may be set in the preset application program, and the preset virtual object may be set according to a characteristic of the preset theme. The preset theme may include various specified interaction information, such as the interaction information of subscribing the preset theme, the interaction information of participating in the preset theme, or the interaction information of sharing the preset theme. The interaction information related to the preset theme may be set as the interaction information and may be triggered for display by using the data display method provided in embodiments of the present disclosure.

In some embodiments, the preset virtual object includes a preset virtual figure; and the method further includes: in a case where the relationship between the second display region and the first display region is determined as meeting the preset condition, controlling the preset virtual figure to complete a preset action. An advantage of this setting is that the preset virtual figure is more vivid, which enhances affinity. The preset action is completed by the preset virtual figure to display richer interaction information, which enhances interest. Optionally, the preset action is, for example, waving, making a hand heart, or making "OK" gestures.

Figure 3:
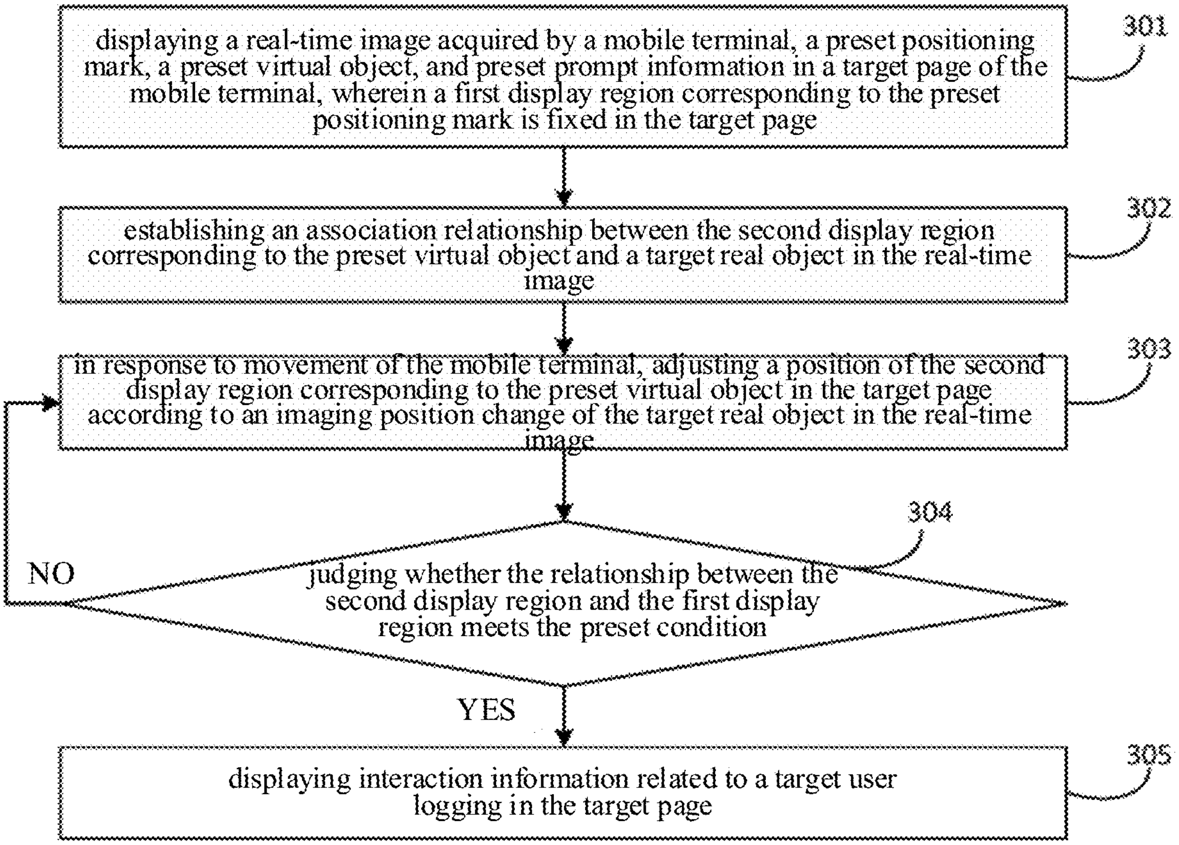
FIG. 3 is a schematic flowchart of another data display method provided by an embodiment of the present disclosure.

FIG. 3 is a flow diagram of another data display method provided by an embodiment of the present disclosure. The embodiment of the present disclosure is refined on the basis of various optional solutions in the above embodiments. For example, the method includes the following steps.

Step 301: displaying a real-time image acquired by a mobile terminal, a preset positioning mark, a preset virtual object, and preset prompt information in a target page of the mobile terminal, wherein a first display region corresponding to the preset positioning mark is fixed in the target page.

For example, interaction information to be triggered for display is specified interaction information of a preset theme in a preset application program, and the preset virtual object is associated with the preset theme.

Figure 4:
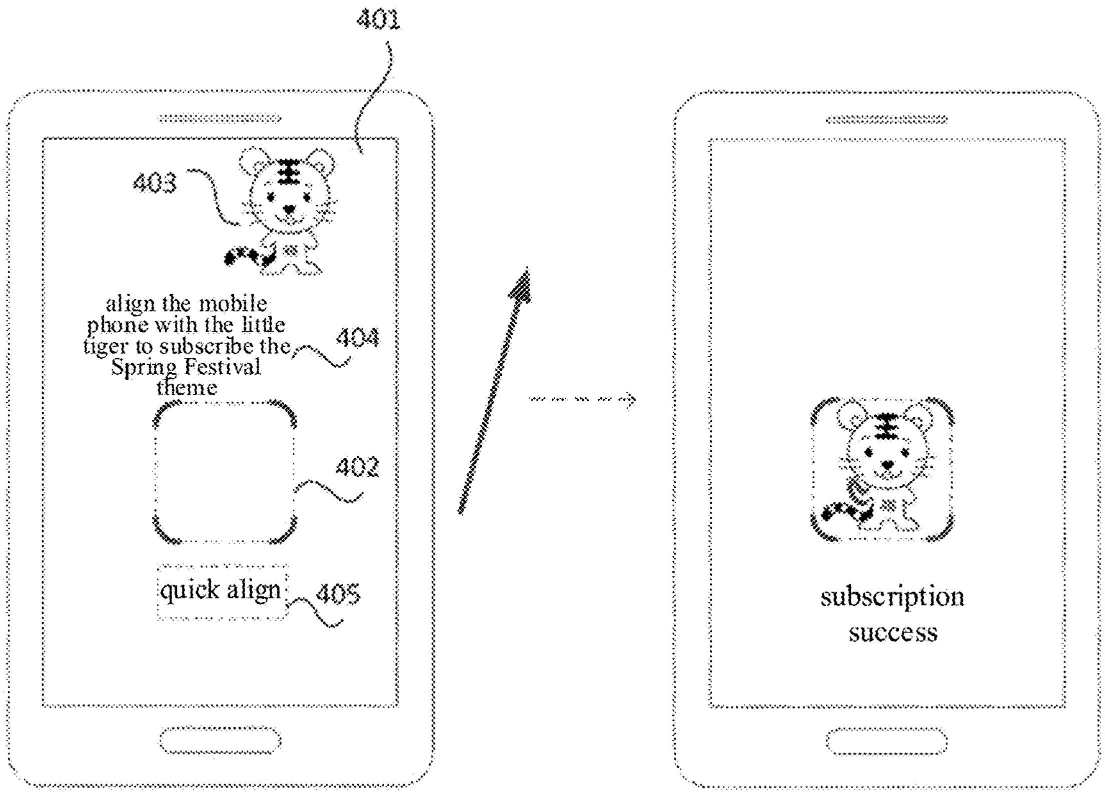
FIG. 4 is a schematic diagram of a page change process provided by an embodiment of the present disclosure.

FIG. 4 is a schematic diagram of a page change process provided by an embodiment of the present disclosure. A Spring Festival theme is illustrated as an example. The interaction information is notification information of successfully subscribing the Spring Festival theme. The real-time image (not illustrated in the figure) acquired by the mobile terminal, a scanning frame 402 (the preset positioning mark), a little tiger FIG. 403 (the preset virtual object), and preset prompt information 404 are displayed in a target page 401. The preset prompt information 404 is used to prompt the user to control the movement of the mobile terminal to trigger display of the interaction information, as illustrated in FIG. 4, "Align the mobile phone with the little tiger to subscribe the Spring Festival theme".

Optionally, a preset control 405 may also be displayed in the target page 401. In a case where it is detected that the preset control 405 is triggered, step 305 may be performed to quickly trigger display of the interaction information.

Figure 5:
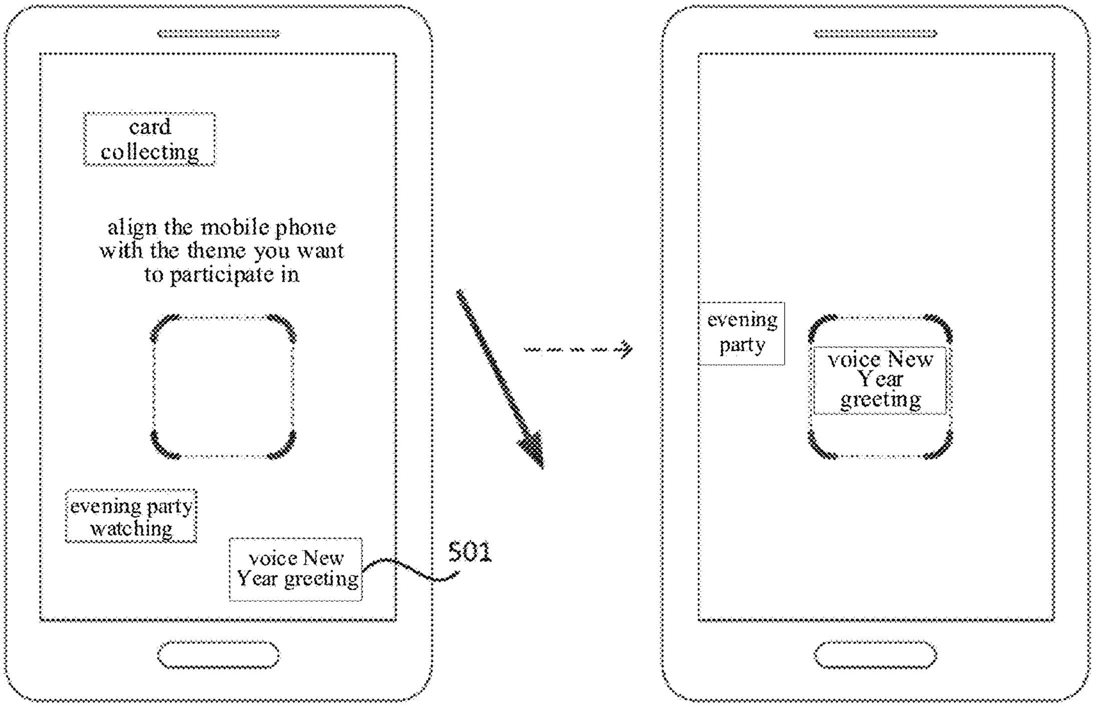
FIG. 5 is a schematic diagram of another page change process provided by an embodiment of the present disclosure.

FIG. 5 is a schematic diagram of another page change process provided by an embodiment of the present disclosure. As illustrated in FIG. 5, a Spring Festival theme is still illustrated as an example. The interaction information is participation information of the Spring Festival theme, and the real-time image (not illustrated in the figure) acquired by the mobile terminal, a scanning frame, virtual invitations corresponding to three different Spring Festival themes (which patterns may be designed according to an actual situation) such as a voice New Year greeting invitation 501, a card-collecting theme invitation, and an evening party watching invitation, and preset prompt information are displayed in a target page. The preset prompt information is used to prompt the user to control the movement of the mobile terminal to trigger display of participation information of a Spring Festival theme the user wants to participate in, as illustrated in FIG. 5, "Align the mobile phone with the theme you want to participate in".

Step 302: establishing an association relationship between the second display region corresponding to the preset virtual object and a target real object in the real-time image.

For example, FIG. 4 is illustrated as an example. It is assumed that when the target page is entered, the second display region corresponding to the little tiger FIG. 403 is an upper-middle region illustrated in the figure, and at this time, a real object imaged in the second display region in the real-time image is a water cup (not illustrated in the figure), and then an association relationship between the second display region and the water cup is established.

Step 303: in response to the movement of the mobile terminal, adjusting a position of the second display region corresponding to the preset virtual object in the target page according to an imaging position change of the target real object in the real-time image.

FIG. 4 is illustrated as an example. After seeing the preset prompt information, the user actively controls the movement of the mobile terminal to align the scanning frame with the little tiger figure. During the movement of the mobile terminal, an imaging position of the water cup in the real-time image changes, and the little tiger figure is controlled to change along with the imaging position of the water cup. That is, the second display region corresponding to the little tiger figure is synchronously adjusted to the imaging position of the water cup in the current real-time image, to implement the position adjustment of the second display region. For the user, it can be seen from the target page that the little tiger figure moves with the water cup to the scanning frame.

Step 304: judging whether the relationship between the second display region and the first display region meets the preset condition; and in a case where the relationship between the second display region and the first display region meets the preset condition, step 305 is performed; or in a case where the relationship between the second display region and the first display region does not meet the preset condition, step 303 is performed again.

For example, in a case where an area of an overlapping region between the second display region and the first display region reaches a preset area threshold, it may be considered that the preset condition is met.

As illustrated in FIG. 4, in response to the user controlling the mobile terminal to move continuously in a direction indicated by a solid arrow, the little tiger FIG. 403 gets closer and closer to the scanning frame 402. Before the area of the overlapping region between the second display region corresponding to the little tiger FIG. 403 and the first display region corresponding to the scanning frame 402 is less than the preset area threshold, for example, before the little tiger FIG. 403 does not completely fall into the scanning frame 402, the second display region may be dynamically adjusted continuously according to the imaging position of the water cup, until the little tiger FIG. 403 completely falls into the scanning frame 402, and then, step 305 may be performed to trigger subscription of the Spring Festival theme and display subscription success information.

Optionally, the preset virtual figure is controlled to complete a preset action in a case where the relationship between the second display region and the first display region meets the preset condition. As illustrated in FIG. 4, after the little tiger FIG. 403 completely falls into the scanning frame 402, the little tiger FIG. 403 may be controlled to complete a waving action, and the subscription is prompted to be successful, which enhances a sense of interaction and improves user experience.

As illustrated in FIG. 5, in response to the user controlling the mobile terminal to move continuously in a direction indicated by a solid arrow, the three virtual invitations also move along with the movement of the mobile terminal. Before an area of an overlapping region between each of second display regions corresponding to the three virtual invitations and the first display region corresponding to the scanning frame is less than the preset area threshold, respective second display regions may be dynamically and continuously adjusted until any virtual invitation (for example, the voice New Year greeting invitation in the figure) completely falls into the scanning frame, and then, step 305 may be performed to trigger a participation event of a Spring Festival theme of voice New Year greeting, and display relevant participation and interaction information, and then a related process such as voice acquisition may be entered.

Step 305: displaying interaction information related to a target user logging in the target page.

According to the data display method provided by embodiments of the present disclosure, the real-time image acquired by the mobile terminal, the preset positioning mark, the preset virtual object associated with the preset theme, and the preset prompt information are displayed in the target page of the mobile terminal, the association relationship between the second display region corresponding to the preset virtual object and the target real object in the real-time image is established, and the position of the second display region is synchronously and dynamically adjusted according to the imaging position change of the target real object in the real-time image until the preset virtual object falls within a range where the preset positioning mark is located, and the specified interaction information of the preset theme is triggered for display. The technical solutions are adopted, so that the user may move the preset virtual object associated with the preset theme toward the preset positioning mark in the real-time image by controlling the movement of the mobile terminal, thereby triggering the specified interaction information of the preset theme for display, which increases the interest of interaction between the user and the mobile terminal and enriches interaction forms.

Figure 6:
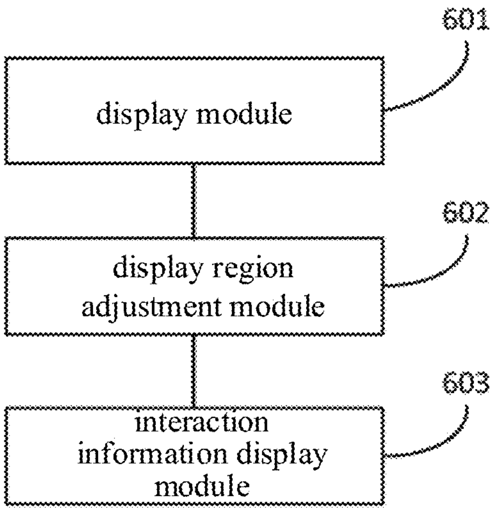
FIG. 6 is a block diagram of a structure of a data display apparatus provided by an embodiment of the present disclosure.

FIG. 6 is a block diagram of a structure of a data display apparatus provided by an embodiment of the present disclosure. The apparatus may be implemented by software and/or hardware, and generally may be integrated in a mobile terminal. Data may be displayed by performing a data display method. As illustrated in FIG. 6, the apparatus includes:

- a display module 601, configured to display a real-time image acquired by a mobile terminal, a preset positioning mark, and a preset virtual object in a target page of the mobile terminal, wherein a first display region corresponding to the preset positioning mark is fixed in the target page;
- a display region adjustment module 602, configured to adjust a second display region corresponding to the preset virtual object in the target page in response to movement of the mobile terminal; and
- an interaction information display module 603, configured to: in a case where a relationship between the second display region and the first display region is determined as meeting a preset condition, display interaction information related to a target user logging in the target page.

According to the data display apparatus provided in embodiments of the present disclosure, the real-time image acquired by the mobile terminal, the preset positioning mark, and the preset virtual object are displayed in the target page of the mobile terminal, wherein the first display region corresponding to the preset positioning mark is fixed in the target page; in response to the movement of the mobile terminal, the second display region corresponding to the preset virtual object is adjusted in the target page, and in a case where the relationship between the second display region and the first display region is determined as meeting the preset condition, the interaction information related to the target user logging in the target page is displayed. The technical solutions are adopted, so that the user can change the preset virtual object and the real-time image at the same time by controlling the movement of the mobile terminal, and upon the relationship between the display region of the preset positioning mark and the display region of the preset virtual object meeting a specified condition, the interaction information of the target user logging in the target page is triggered for display, which increases the interest of interaction between the user and the mobile terminal and enriches interaction forms.

Optionally, the apparatus further includes: an association relationship establishment module, configured to: before adjusting the second display region corresponding to the preset virtual object in the target page, establish an association relationship between the second display region corresponding to the preset virtual object and a target real object in the real-time image;

- a display region adjustment module, configured to: in response to the movement of the mobile terminal, adjust a position and/or a size of the second display region corresponding to the preset virtual object in the target page according to an imaging position change and/or an imaging size change of the target real object in the real-time image.

Optionally, the display region adjustment module includes:

a movement data obtaining unit, configured to obtain movement data of the mobile terminal in response to the movement of the mobile terminal;

a display region adjustment unit, configured to adjust the position and/or the size of the second display region corresponding to the preset virtual object in the target page according to the movement data.

Optionally, the relationship between the second display region and the first display region meeting the preset condition includes:

an area of an overlapping region between the second display region and the first display region is larger than or equal to a preset area threshold.

Optionally, the movement data includes a movement direction and a movement distance. The display region adjustment module includes:

a data obtaining unit, configured to obtain the movement data of the mobile terminal;

a first vector determining unit, configured to determine a first motion vector of the mobile terminal on a plane where the target page is located according to the movement data;

a second vector determining unit, configured to determine a second motion vector according to the first motion vector, wherein a direction of the second motion vector is opposite to a direction of the first motion vector, and a length of the second motion vector is positively correlated with a length of the first motion vector;

a position adjustment unit, configured to adjust the position of the second display region corresponding to the preset virtual object in the target page according to the second motion vector.

Optionally, the display region adjustment module further includes:

a size adjustment unit, configured to adjust the size of the second display region corresponding to the preset virtual object in the target page according to the length of the second motion vector, wherein the size is positively correlated with the length of the second motion vector.

Optionally, the apparatus further includes:

a control display module, configured to display a preset control associated with the preset virtual object in the target page; and an automatic adjustment module, configured to: in response to the preset control being triggered, automatically adjust the second display region corresponding to the preset virtual object in the target page within a preset duration, so that the relationship between the second display region and the first display region meets the preset condition.

Optionally, a count of the preset virtual objects is at least one; in a case where the count of the preset virtual objects is at least two, a count of pieces of the interaction information is at least two, and interaction information corresponding to different preset virtual objects is different; and the interaction information includes specified interaction information of a preset theme, and the preset virtual object is associated with the preset theme.

Optionally, the apparatus further includes:

an information display module, configured to display preset prompt information in the target page, wherein the preset prompt information is used to prompt the user to control the movement of the mobile terminal to trigger display of the interaction information.

Optionally, the preset virtual object includes a preset virtual figure; and the apparatus further includes:

an action control module, configured to control the preset virtual figure to complete a preset action in a case where the relationship between the second display region and the first display region meets the preset condition.

Figure 7:
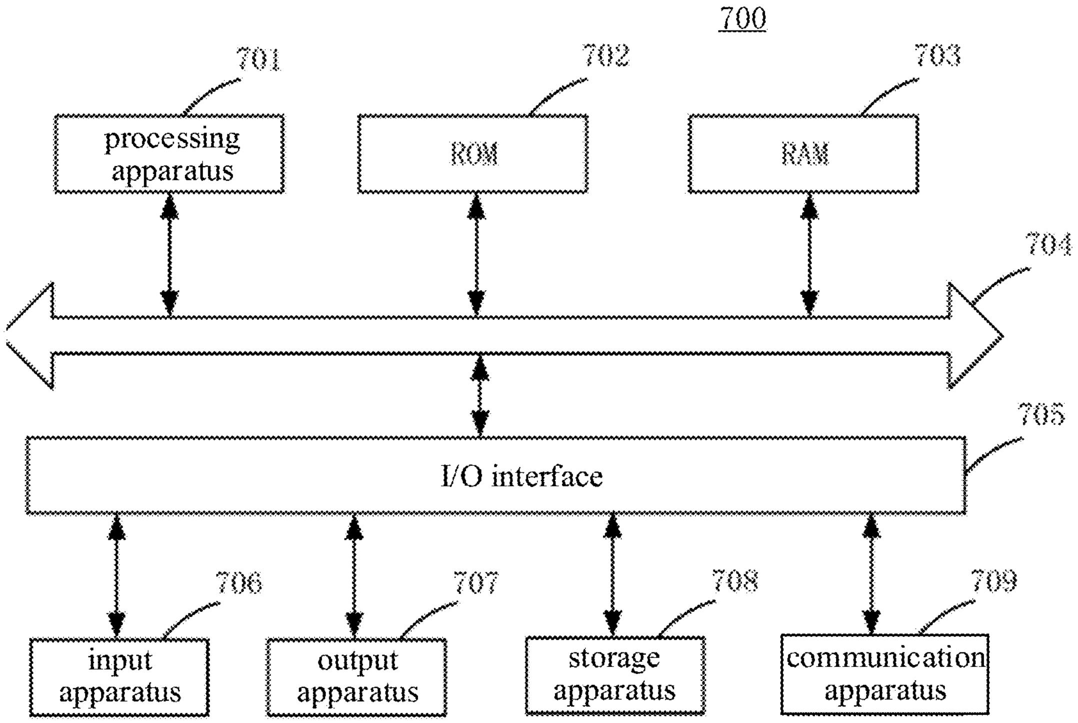
FIG. 7 is a block diagram of a structure of a mobile terminal provided by an embodiment of the present disclosure.

Refer to FIG. 7 below. FIG. 7 illustrates a schematic diagram of a structure of a mobile terminal 700 suitable for implementing embodiments of the present disclosure. The mobile terminal in embodiments of the present disclosure may include, but is not limited to, a mobile terminal such as a mobile phone, a notebook computer, a digital broadcast receiver, a personal digital assistant (PDA), a PAD (a tablet computer), a portable multimedia player (a PMP), a vehicle-mounted terminal (for example, a vehicle-mounted navigation terminal); and a fixed terminal such as a digital TV, a desktop computer. The mobile terminal illustrated in FIG. 7 is just an example and should not have any limitation to functions and an application scope of embodiments of the present disclosure.

As illustrated in FIG. 7, the mobile terminal 700 may include a processing apparatus (for example, a central processing unit or a graphics processor) 701. The processing apparatus 701 may perform various appropriate actions and processes according to a program stored in a read-only memory (ROM) 702 or a program loaded from a storage apparatus 708 into a random access memory (RAM) 703. In the RAM 703, various programs and data required for operations of the mobile terminal 700 are also stored. The processing apparatus 701, the ROM 702, and the RAM 703 are connected to each other through a bus 704. An input/output (I/O) interface 705 is also connected to the bus 704.

Generally, the following apparatuses may be connected to the I/O interface 705: an input apparatus 706 including, for example, a touch screen, a touch pad, a keyboard, a mouse, a camera, a microphone, an accelerometer, a gyroscope; an output apparatus 707 including, for example, a liquid crystal display (LCD), a speaker, or a vibrator; a storage apparatus 708 including, for example, a magnetic tape or a hard disk; and a communication apparatus 709. The communication apparatus 709 may allow the mobile terminal 700 to perform wireless or wired communication with another apparatus to exchange data. Although FIG. 7 illustrates the mobile terminal 700 having various apparatuses, it should be understood that it is not required to implement or provide all the shown apparatuses. More or fewer apparatuses may alternatively be implemented or provided.

In particular, according to embodiments of the present disclosure, the process described above with reference to the flowchart may be implemented as a computer software program. For example, an embodiment of the present disclosure includes a computer program product including a computer program carried in a non-transitory computer-readable medium. The computer program includes program code for performing the methods shown in the flowcharts. In such an embodiment, the computer program may be downloaded and installed from a network through the communication apparatus 709, or installed from the storage apparatus 708, or installed from the ROM 702. When the computer program is executed by the processing apparatus 701, the above functions defined in the methods of embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

The above-mentioned computer-readable medium may be included in the above-mentioned electronic device or may also exist alone without being assembled into the electronic device.

The above computer-readable medium carries one or more programs. When the one or more programs are executed by the mobile terminal, the mobile terminal is enabled to: display a real-time image acquired by the mobile terminal, a preset positioning mark, and a preset virtual object in a target page of the mobile terminal, wherein a first display region corresponding to the preset positioning mark is fixed in the target page; in response to movement of the mobile terminal, adjust a second display region corresponding to the preset virtual object in the target page, and in a case where a relationship between the second display region and the first display region is determined as meeting a preset condition, display interaction information related to a target user logging in the target page.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the “C” programming language or similar programming languages. The program code may be executed entirely on the user’s computer, partly on the user’s computer, as a stand-alone software package, partly on the user’s computer and partly on a remote computer, or entirely on the remote computer or server. In the scenario related to the remote computer, the remote computer may be connected to the user’s computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules described in embodiments of the present disclosure may be implemented by software or hardware. Among them, a name of a module does not limit the module. For example, the interaction information display module may also be described as “a module which displays, in a case where it is determined that the relationship between the second display region and the first display region meets the preset condition, the interaction information related to the target user logging in the target page”.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to at least one embodiment of the present disclosure, a data display method is provided. The method includes:

displaying a real-time image acquired by a mobile terminal, a preset positioning mark, and a preset virtual object in a target page of the mobile terminal, wherein a first display region corresponding to the preset positioning mark is fixed in the target page;

adjusting a second display region corresponding to the preset virtual object in the target page in response to movement of the mobile terminal; and in a case where a relationship between the second display region and the first display region is determined as meeting a preset condition, displaying interaction information related to a target user logging in the target page.

Optionally, before adjusting the second display region corresponding to the preset virtual object in the target page, the method further includes:

establishing an association relationship between the second display region corresponding to the preset virtual object and a target real object in the real-time image;

wherein the adjusting the second display region corresponding to the preset virtual object in the target page in response to movement of the mobile terminal includes:

in response to the movement of the mobile terminal, adjusting a position and/or a size of the second display region corresponding to the preset virtual object in the target page according to an imaging position change and/or an imaging size change of the target real object in the real-time image.

Optionally, the adjusting the second display region corresponding to the preset virtual object in the target page in response to movement of the mobile terminal includes:

in response to the movement of the mobile terminal, obtaining movement data of the mobile terminal, and adjusting the position and/or the size of the second display region corresponding to the preset virtual object in the target page according to the movement data.

Optionally, a relationship between the second display region and the first display region meeting a preset condition includes:

an area of an overlapping region between the second display region and the first display region is larger than or equal to a preset area threshold.

Optionally, the method further includes:

displaying a preset control associated with the preset virtual object in the target page; and in response to the preset control being triggered, automatically adjusting the second display region corresponding to the preset virtual object in the target page within a preset duration, so that the relationship between the second display region and the first display region meets the preset condition.

Optionally, a count of the preset virtual objects is at least one; in a case where the count of the preset virtual objects is at least two, a count of pieces of the interaction information is at least two, and the interaction information corresponding to different preset virtual objects is different; and the interaction information comprises specified interaction information of a preset theme, and the preset virtual object is associated with the preset theme.

Optionally, the method further includes: displaying preset prompt information in the target page, wherein the preset prompt information is used to prompt a user to control the movement of the mobile terminal to trigger display of the interaction information.

Optionally, the preset virtual object includes a preset virtual figure; and the method further includes:

controlling the preset virtual figure to complete a preset action upon the relationship between the second display region and the first display region meeting the preset condition.

According to at least one embodiment of the present disclosure, a data display apparatus is provided. The apparatus includes:

a display module, configured to display a real-time image acquired by a mobile terminal, a preset positioning mark, and a preset virtual object in a target page of the mobile terminal, wherein a first display region corresponding to the preset positioning mark is fixed in the target page;

a display region adjustment module, configured to adjust a second display region corresponding to the preset virtual object in the target page in response to movement of the mobile terminal; and an interaction information display module, configured to: in a case where a relationship between the second display region and the first display region is determined as meeting a preset condition, display interaction information related to a target user logging in the target page.

In addition, although operations are described in a particular order, this should not be understood as requiring those operations to be performed in the particular order indicated or in a sequential order. In certain circumstances, multitasking and parallel processing can be advantageous. Similarly, although certain implementation details are included in the above discussion, these should not be interpreted as limiting the scope of this disclosure. Certain features described in the context of individual embodiments can also be implemented in combination in a single embodiment. Conversely, various features described in the context of a single embodiment can also be implemented in multiple embodiments individually or in any suitable sub-combination.

The invention claimed is:

1. A data display method, comprising:

displaying a real-time image acquired by a mobile terminal, a preset positioning mark, and a preset virtual object in a page of the mobile terminal, wherein a first display region corresponding to the preset positioning mark is fixed in the page;

adjusting a second display region corresponding to the preset virtual object in the page in response to movement of the mobile terminal, wherein the preset virtual object is displayed in the second display region; and in response to a relationship between the second display region and the first display region being determined as meeting a preset condition, displaying interaction information related to a user logging in the page, wherein the relationship between the second display region and the first display region meeting the preset condition comprises:

an area of an overlapping region between the second display region and the first display region is larger than or equal to a preset area threshold, and the preset virtual object completely falls into the first display region, and a direction of the movement of the mobile terminal only comprises a direction of a distance between a center point of the first display region and a center point of the second display region being continuously reduced.

2. The method according to claim 1, wherein before adjusting the second display region corresponding to the preset virtual object in the page, the method further comprises:

establishing an association relationship between the second display region corresponding to the preset virtual object and a first real object in the real-time image, wherein the adjusting the second display region corresponding to the preset virtual object in the page in response to movement of the mobile terminal comprises:

in response to the movement of the mobile terminal, adjusting at least one of a position and a size of the second display region corresponding to the preset virtual object in the page according to at least one of an imaging position change and an imaging size change of the first real object in the real-time image.

3. The method according to claim 1, wherein the adjusting the second display region corresponding to the preset virtual object in the page in response to movement of the mobile terminal comprises:

in response to the movement of the mobile terminal, obtaining movement data of the mobile terminal, and adjusting at least one of a position and a size of the second display region corresponding to the preset virtual object in the page according to the movement data.

4. The method according to claim 1, further comprising:

displaying a preset control associated with the preset virtual object in the page; and in response to the preset control being triggered, automatically adjusting the second display region corresponding to the preset virtual object in the page within a preset duration, so that the relationship between the second display region and the first display region meets the preset condition.

5. The method according to claim 1, wherein a count of the preset virtual objects is at least one; in a case where the count of the preset virtual objects is at least two, a count of pieces of the interaction information is at least two, and the interaction information corresponding to different preset virtual objects is different; and the interaction information comprises specified interaction information of a preset theme, and the preset virtual object is associated with the preset theme.

6. The method according to claim 1, further comprising:

displaying preset prompt information in the page, wherein the preset prompt information is used to prompt a user to control the movement of the mobile terminal to trigger display of the interaction information.

7. The method according to claim 1, wherein the preset virtual object comprises a preset virtual figure; and the method further comprises:

controlling the preset virtual figure to complete a preset action in response to the relationship between the second display region and the first display region meeting the preset condition.

8. The method according to claim 2, further comprising:

displaying preset prompt information in the page, wherein the preset prompt information is used to prompt a user to control the movement of the mobile terminal to trigger display of the interaction information.

9. The method according to claim 3, further comprising:

displaying preset prompt information in the page, wherein the preset prompt information is used to prompt a user to control the movement of the mobile terminal to trigger display of the interaction information.

10. The method according to claim 3, further comprising:

displaying preset prompt information in the page, wherein the preset prompt information is used to prompt a user to control the movement of the mobile terminal to trigger display of the interaction information.

11. The method according to claim 2, wherein the preset virtual object comprises a preset virtual figure; and the method further comprises:

controlling the preset virtual figure to complete a preset action in response to the relationship between the second display region and the first display region meeting the preset condition.

12. The method according to claim 3, wherein the preset virtual object comprises a preset virtual figure; and the method further comprises:

controlling the preset virtual figure to complete a preset action in response to the relationship between the second display region and the first display region meeting the preset condition.

13. The method according to claim 1, wherein the preset virtual object comprises a preset virtual figure; and the method further comprises:

controlling the preset virtual figure to complete a preset action in response to the relationship between the second display region and the first display region meeting the preset condition.

14. The method according to claim 4, wherein the preset virtual object comprises a preset virtual figure; and the method further comprises:

controlling the preset virtual figure to complete a preset action in response to the relationship between the second display region and the first display region meeting the preset condition.

15. The method according to claim 5, wherein the preset virtual object comprises a preset virtual figure; and the method further comprises:

controlling the preset virtual figure to complete a preset action in response to the relationship between the second display region and the first display region meeting the preset condition.

16. The method according to claim 6, wherein the preset virtual object comprises a preset virtual figure; and the method further comprises:

controlling the preset virtual figure to complete a preset action in response to the relationship between the second display region and the first display region meeting the preset condition.

17. The mobile terminal according to claim 9, wherein before adjusting the second display region corresponding to the preset virtual object in the page, the method further comprises:

establishing an association relationship between the second display region corresponding to the preset virtual object and a first real object in the real-time image, wherein the adjusting the second display region corresponding to the preset virtual object in the page in response to movement of the mobile terminal comprises:

in response to the movement of the mobile terminal, adjusting at least one of a position and a size of the second display region corresponding to the preset virtual object in the page according to at least one of an imaging position change and an imaging size change of the first real object in the real-time image.

18. A mobile terminal comprising at least one memory, at least one processor, and at least one computer program stored in the at least one memory and executable on the at least one processor, wherein the at least one processor implements a data display method when executing the at least one computer program, and the method comprises:

displaying a real-time image acquired by a mobile terminal, a preset positioning mark, and a preset virtual object in a page of the mobile terminal, wherein a first display region corresponding to the preset positioning mark is fixed in the page;

adjusting a second display region corresponding to the preset virtual object in the page in response to movement of the mobile terminal, wherein the preset virtual object is displayed in the second display region; and in response to a relationship between the second display region and the first display region being determined as meeting a preset condition, displaying interaction information related to a first user logging in the page, wherein the relationship between the second display region and the first display region meeting the preset condition comprises:

an area of an overlapping region between the second display region and the first display region is larger than or equal to a preset area threshold, and the preset virtual object completely falls into the first display region, and a direction of the movement of the mobile terminal only comprises a direction of a distance between a center point of the first display region and a center point of the second display region being continuously reduced.

19. A non-transient computer-readable storage medium storing a computer program thereon, wherein a data display method is implemented when the computer program is executed by a processor, and method comprises:

displaying a real-time image acquired by a mobile terminal, a preset positioning mark, and a preset virtual object in a page of the mobile terminal, wherein a first display region corresponding to the preset positioning mark is fixed in the page;

adjusting a second display region corresponding to the preset virtual object in the page in response to movement of the mobile terminal, wherein the preset virtual object is displayed in the second display region; and in response to a relationship between the second display region and the first display region being determined as meeting a preset condition, displaying interaction information related to a first user logging in the page, wherein the relationship between the second display region and the first display region meeting the preset condition comprises:

an area of an overlapping region between the second display region and the first display region is larger than or equal to a preset area threshold, and the preset virtual object completely falls into the first display region, and a direction of the movement of the mobile terminal only comprises a direction of a distance between a center point of the first display region and a center point of the second display region being continuously reduced.

* * * * *